United States Patent
Wang

(10) Patent No.: US 8,533,497 B2
(45) Date of Patent: Sep. 10, 2013

(54) POWER CONTROL METHOD OF SERVERS

(75) Inventor: Xiao-Hua Wang, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 264 days.

(21) Appl. No.: 13/031,619

(22) Filed: Feb. 22, 2011

(65) Prior Publication Data

US 2012/0137141 A1    May 31, 2012

(30) Foreign Application Priority Data

Nov. 30, 2010 (CN) .......................... 2010 1 0575240

(51) Int. Cl.
*G06F 1/00* (2006.01)
*G06F 15/177* (2006.01)
*B23K 11/24* (2006.01)

(52) U.S. Cl.
USPC ............ 713/300; 713/310; 713/330; 323/318; 709/220

(58) Field of Classification Search
USPC .......... 713/300, 310, 330; 323/318; 709/220
See application file for complete search history.

(56) References Cited

U.S. PATENT DOCUMENTS

| | | | |
|---|---|---|---|
| 6,968,465 B2 * | 11/2005 | Freevol et al. | 713/300 |
| 7,444,532 B2 * | 10/2008 | Masuyama et al. | 713/330 |
| 7,475,267 B1 * | 1/2009 | Cocosel | 713/330 |
| 2008/0303692 A1 * | 12/2008 | Hirai | 340/825.52 |

* cited by examiner

*Primary Examiner* — Stefan Stoynov
(74) *Attorney, Agent, or Firm* — CKC & Partners Co., Ltd.

(57) ABSTRACT

A power control method of servers is disclosed, where each of the servers includes a corresponding baseboard management controller. This method includes steps as follow. A rack management device is used for acquiring identification codes of the servers, wherein the identification codes of the servers are different from each other. Then, delay times based on the identification codes of the servers are generated by means of the rack management device, so that when each time passing through one of the delay times, the rack management device can send a power-on command to the corresponding server. The baseboard management controller can supply the power to the server according to the power-on command.

9 Claims, 2 Drawing Sheets

POWER CONTROL METHOD OF SERVERS

RELATED APPLICATIONS

This application claims priority to China Application Serial Number 201010575240.6, filed Nov. 30, 2010, which is herein incorporated by reference.

BACKGROUND

1. Field of Invention

The present invention relates to a control method, and more particularly to a power control method of a plurality of servers.

2. Description of Related Art

In recent years, with the industrial and commercial development and the society progress, products are provided under the theme of convenience, certainty, and economy. Therefore, the currently developed products are more advanced than before, thereby serving the society better.

As hardware, a server generally refers to a computer with high computing ability which can be provided to a plurality of users to use. The server differs from a PC in many aspects. For example, the PC usually serves only one user at one moment. The server is different from a host. The host is used by the user through a terminal, and the server is used by a client user over a network.

According to different computing capabilities, the server is divided into a working group server, a department server and an enterprise server. A server operating system refers to an operating system which is performed on the server hardware. The server operating system needs to manage and make full use of the computing capability of the server hardware and is provided to be used by software on the server hardware.

However, dozens of servers can be disposed together in a rack. Since the servers need very large power efficiency at the moment of powered on, the electric power will certainly be too large if the powers of the servers in the rack are turned on at the same time. Thus, the above mention causes unexpected conditions such as damaging the equipments.

In view of the above, the existing method still has obvious inconvenience and defects and needs further improvement. In order to solve the above problems, those skilled in the art are trying hard to find a solution, but no applicable method is put forward. Therefore, it is an important subject and also a purpose in need of improvement how to avoid simultaneously powering on the servers on the rack.

SUMMARY

Therefore, an aspect of the present invention provides a power control method of a plurality of servers to avoid turning on the powers of the servers in a rack simultaneously.

According to an embodiment of the present invention, each of the servers has a corresponding baseboard management controller (BMC), and the power control method comprises the following steps:

(a) acquiring identification codes of the servers by a rack management device, wherein the identification codes of the servers are different from each other and (b) generating a plurality of delay periods based on the identification codes by the rack management device, wherein the rack management device sends a power-on command to the corresponding server after any one of the delay periods, and therefore, the corresponding baseboard management controller of the server supplies the power to the corresponding server according to the power-on command.

In step (a), the rack management device can be used for acquiring a media access control address (Mac address) of each baseboard management controllers to be the identification code.

Furthermore, in step (b), each of the Mac addresses can be used to generate a corresponding random number and generate the delay periods according to the random numbers.

Alternatively, in step (a), the rack management device can be used to look into a static table for acquiring an Internet protocol address (IP address) of each servers to be the identification code according to a static table by the rack management device.

Furthermore, in step (b), the last bit of each IP address can be used to generate a corresponding random number and generate the delay periods according to the random numbers.

In the above power control method, each of the baseboard management controllers can be initialized first, and then the rack management device is also initialized.

The above rack management device can be coupled to the servers through a management network so as to output the power-on commands according to an input instruction.

Furthermore, in the above power control method, a user interface electrically coupled to the rack management device is provided, and the input instruction is generated by the user interface.

Moreover, a power restore state of a basic input/output system of each server is set to be always OFF.

In sum, the technical scheme of the present invention has apparent advantages and beneficial effects compared with the conventional art. The above technical scheme can achieve considerable technical progress and has a wide utility value in industry. The technical scheme has at least the following advantages;

1. This technical scheme effectively avoids turning on the powers of the servers in the rack simultaneously; and 2. The instant activating power consumption is optimized and the stability of the servers is improved.

The illustration above and the following embodiments are described in details through embodiments below, and further illustration of the technical scheme of the present invention is provided.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
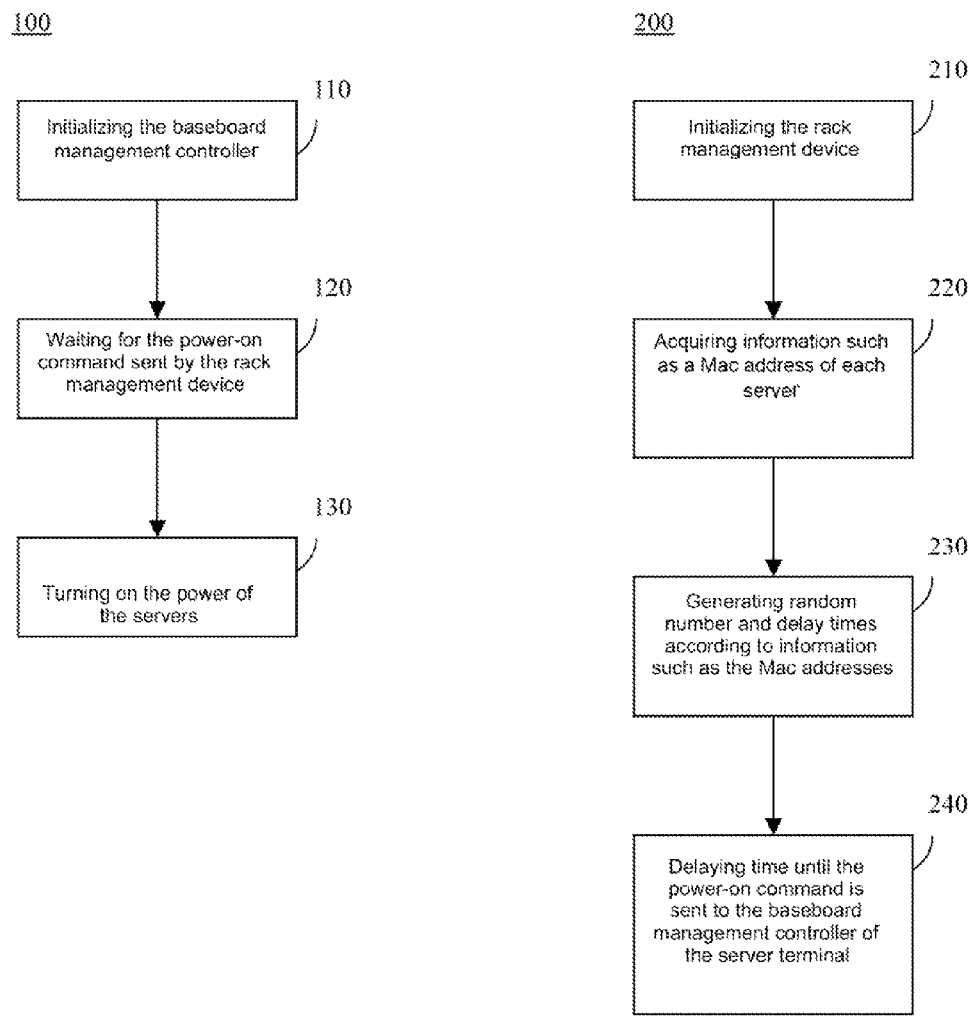
FIG. 1 is a flow chart of a server terminal and a flow chart of a rack management device in a power control method of plural servers according to one embodiment of the present invention.

In order to make the description of the present invention more detailed and more comprehensive, various embodiments are described below with reference to the accompanying drawings, wherein like reference numerals refer to like elements throughout. In addition, well-known elements and steps are not described in the embodiments to avoid causing unnecessary limitations to the present invention.

In practical, a plurality of servers can be disposed in a rack. Since the servers need very large power efficiency at the moment of powered on, the electric power will certainly be too large if the powers of the servers in the rack are turned on at the same time. Thus, the above mention causes unexpected conditions such as damaging the equipments. In view of the above, the technical aspect of the present invention is a power control method of a plurality of servers. The method can be applied to existing devices or devices in development, or can be used widely in the related art. It should be noted that the application of this control method can avoid turning on the powers of the servers in a rack simultaneously. Specific embodiments of this control method are illustrated below with reference to FIGS. 1 and 2.

FIG. 1 is a flow chart 100 of a server terminal and a flow chart 200 of a rack management device in a power control method of a plurality of servers according to one embodiment of the present invention. In this embodiment, the power control method controls the power-on sequence of a plurality of servers, wherein each of the servers has a corresponding baseboard management controller, and a rack management device is connected with each server. As shown in FIG. 1, the flow chart 100 of the server terminal includes steps 110-130, and the flow chart 200 of the rack management device includes steps 210-240 (It should be appreciated that the sequence of the steps mentioned in this embodiment may be adjusted, and the steps may even be executed simultaneously or partially simultaneously as required unless specified otherwise).

With respect to the flow chart 100 of the server terminal, in an initialization step 110, each of the baseboard management controllers is initialized. In a waiting step 120, the baseboard management controller waits for the power-on command sent by the rack management device.

With respect to the flow chart 200 of the rack management device, in an initialization step 210, a rack management device is initialized.

In an information acquiring step 220, the rack management device is used for acquiring identification codes of the servers, wherein the identification codes of the servers are different from each other. More particularly, in the information acquiring step 220, the rack management device can be used for acquiring a Mac address of each baseboard management controllers to be the identification code.

In a delay step 230, the rack management device is used to generate a plurality of delay periods based on the identification codes. More particularly, in the delay step 230, each of the Mac addresses can be used to generate a corresponding random number, and the delay periods are generated according to the random numbers, wherein the delay times set by the random numbers are different from each other and a predetermined duration of each delay time can be adjusted flexibly by a system administrator or others according to an actual application.

In a command step 240, the rack management device sends a power-on command to the corresponding server after any one of the delay periods. Then, returning to the power-on step 130 in the flow chart 100 of the server terminal, the baseboard management controller supplies the power to the corresponding server according to the power-on command. Since the delay times are different from each other, the times of sending each power-on command by the rack management device are staggered, so that the powers of the servers are turned on sequentially, thereby avoiding turning on the powers of the servers in the rack simultaneously.

With respect to the flow chart of FIG. 1, for example, the rack management device can be coupled to the servers through a management network so as to output the power-on commands according to an input instruction. Furthermore, a user interface electrically coupled to the rack management device can be provided and the input instruction is generated through the user interface. Moreover, a power restore state of a basic input/output system of each server is set to be always OFF.

Figure 2:
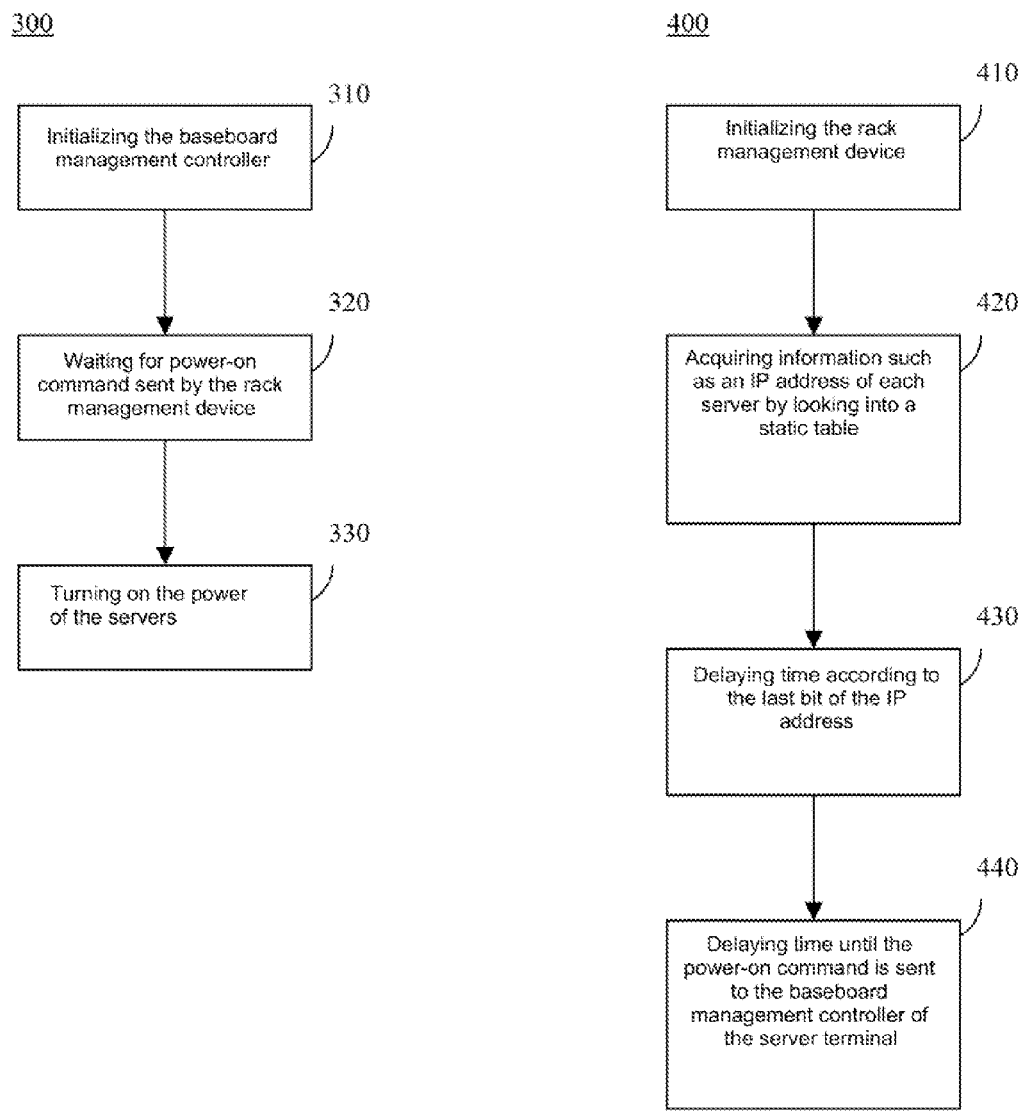
FIG. 2 is flow chart of the server terminal and a flow chart of the rack management device in a power control method of plural servers according to another embodiment of the present invention.

FIG. 2 is a flow chart 300 of the server terminal and a flow chart 400 of the rack management device in a power control method of plural servers according to another embodiment of the present invention. In this embodiment, the power control method controls the power-on sequence of a plurality of servers, wherein each of the servers has a corresponding baseboard management controller, and a rack management device is connected with each server. As shown in FIG. 2, the flow chart 300 of the server terminal includes steps 310-330, and the flow chart 400 of the rack management device includes steps 410-440 (It should be appreciated that the sequence of the steps mentioned in this embodiment may be adjusted, or the steps may even be executed simultaneously or partially simultaneously as required unless specified otherwise).

With respect to the flow chart 300 of the server terminal, in an initialization step 310, each of the baseboard management controllers is initialized. In a waiting step 320, the baseboard management controller waits for power-on command sent by the rack management device.

With respect to the flow chart 400 of the rack management device, in an initialization step 410, a rack management device is initialized.

In a search step 420, the rack management device is used for acquiring the identification codes of the servers, wherein the identification codes of the servers are different from each other. More particularly, since the servers on the rack are in the same network domain, the former several bits of IP addresses of the servers are approximately the same. Thus, in the search step 420, the rack management device can be used to look into a static table for acquiring the IP address of each server to be the identification code according to a static table by the rack management device, wherein the IP addresses of the servers may be preload in the static table.

In a delay step 430, the rack management device is used to generate a plurality of delay periods based on the identification codes. More particularly, in the delay step 430, the last bit of each IP address can be used to generate a corresponding random number, and the delay periods are generated according to the random numbers, wherein the delay times set by the random numbers are different from each other and the predetermined duration of each delay time can be adjusted flexibly by a system administrator or others according to the actual application.

In a command step 440, when each time passing through any one of the delay times, the rack management device sends a power-on command to the corresponding server. Then, returning to the power-on step 330 in the flow chart 300 of the server terminal, the baseboard management controller supplies the power to the corresponding server according to the power-on command. Since the delay times are different from each other, the times of sending each power-on command by the rack management device are staggered, so that the powers of the servers are turned on sequentially, thereby avoiding turning on the powers of the servers in the rack simultaneously.

With respect to the flow chart of FIG. 2, for example, the rack management device can be coupled to the servers through a management network so as to output the power-on commands according to an input instruction. Furthermore, a user interface electrically coupled to the rack management device can be provided and the input instruction is generated through the user interface. Moreover, a power restore state of a basic input/output system of each servers is set to be always OFF.

The above power control method can be executed by software, hardware and/or firmware. For example, if the execution speed and the accuracy are primarily considered, the hardware and/or the firmware may be selected. If the design flexibility is primarily considered, the software may be selected. Alternatively, the software, hardware and firmware may operate collaboratively. It should be appreciated that the above examples have no preferences and should not be regarded as the limitations to the present invention. Those skilled in the art an make flexible design optionally when required.

Furthermore, those of ordinary skill in the art should understand that the steps of the power control method are named according to the functions that they execute. The steps are provided for making the technique of the disclosure easy to understand and should not be regarded as the limitations to the present invention. The steps may be integrated into one step or split into plural steps, or any step may be executed in another step, which shall fall within the scope of the present invention.

In practice, the major steps of the power control method may be realized by the baseboard management controller of the server in combination with the rack management device, and part of the functions may also be made into a software program and stored in a computer readable recording media, such that the server reads the recording media and then the operation system thereof executes the power control method.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A power control method of a plurality of servers, wherein each of the servers has a corresponding baseboard management controller, and the power control method comprises:
   acquiring identification codes of the servers by a rack management device, wherein the identification codes of the servers are different from each other; and
   generating a plurality of delay periods based on the identification codes by the rack management device, wherein the rack management device sends a power-on command to the corresponding server after any one of the delay periods, and therefore, the baseboard management controller of the corresponding server supplies the power to the corresponding server according to the power-on command.

2. The power control method of claim 1, wherein the step of acquiring identification codes of the servers by the rack management device comprises:
   acquiring a media access control address of each baseboard management controller by the rack management to be the identification code.

3. The power control method of claim 2, wherein the step of generating the plurality of delay periods based on the identification codes by the rack management device comprises:
   generating a corresponding random number by each of the media access control addresses; and
   generating the delay periods according to the random numbers.

4. The power control method of claim 1, wherein the step of acquiring identification codes of the servers by the rack management device comprises:
   acquiring an IP address of each server to be the identification code according to a static table by the rack management device.

5. The power control method of claim 4, wherein the step of generating the plurality of delay periods based on the identification codes by using the rack management device comprises:
   generating a corresponding random number by the last bit of each IP address; and
   generating the delay periods according to the random numbers.

6. The power control method of claim 1, further comprising:
   initializing each of the baseboard management controllers; and
   initializing the rack management device.

7. The power control method of claim 1, wherein the rack management device is coupled to the servers through a management network so as to output the power-on commands according to an input instruction.

8. The power control method of claim 1, further comprising:
   providing a user interface electrically coupled to the rack management device, wherein the input instruction is generated by the user interface.

9. The power control method of claim 1, wherein a power restore state of a basic input/output system of each server is set to be always OFF.

* * * * *